No. 690,550. Patented Jan. 7, 1902.
J. BARRETT.
WASHSTAND FIXTURE.
(Application filed Mar. 31, 1900.)
(No Model.) 2 Sheets—Sheet 1.
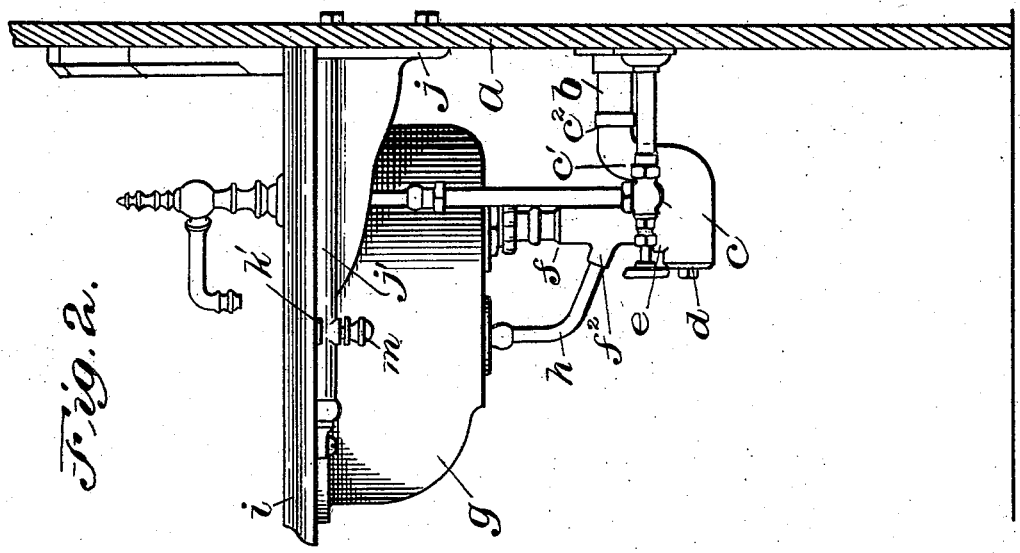
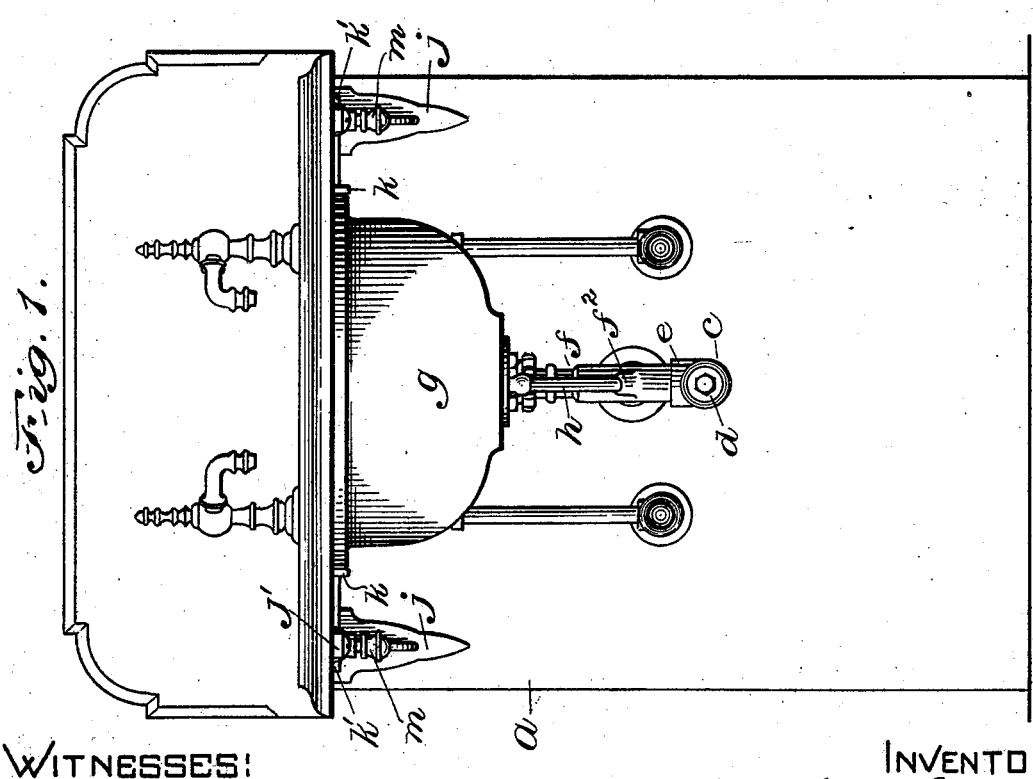
WITNESSES:
Rollin Abell
A. J. Dailey.
INVENTOR
James Barrett,
by Crossley & Davis
his Attys.

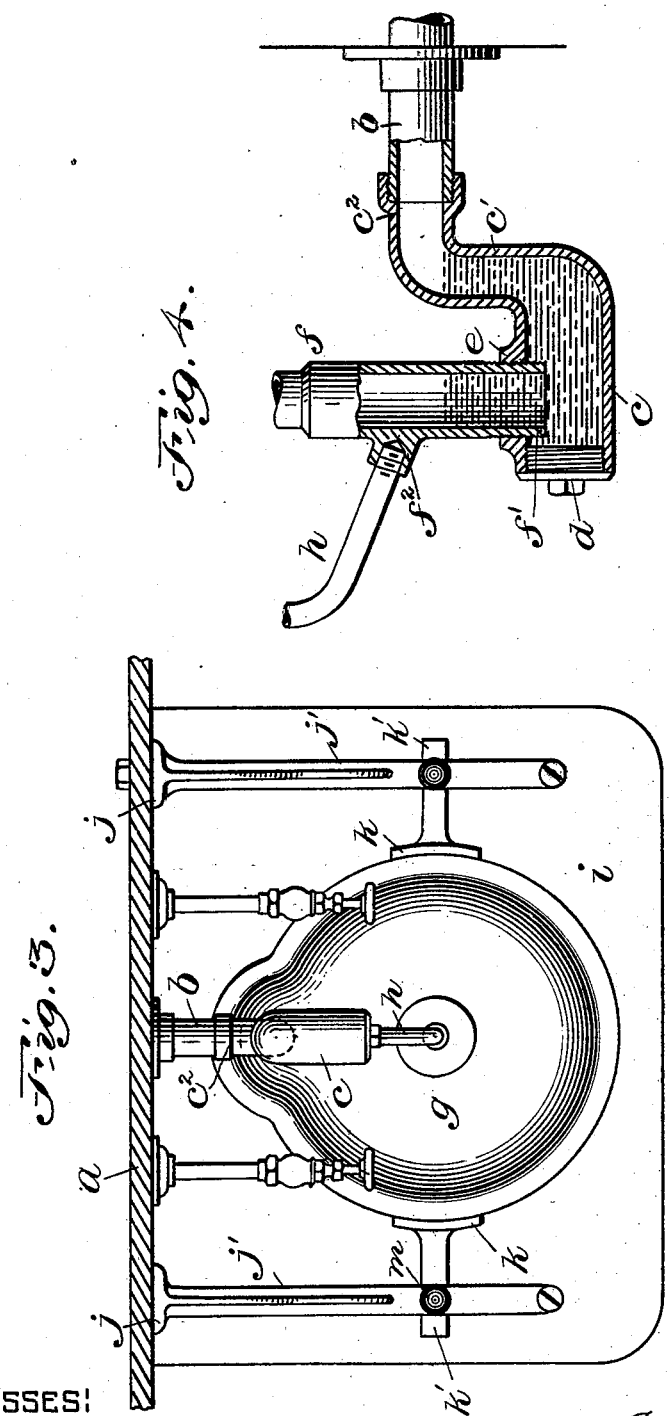

UNITED STATES PATENT OFFICE.

JAMES BARRETT, OF BOSTON, MASSACHUSETTS.

WASHSTAND-FIXTURE.

SPECIFICATION forming part of Letters Patent No. 690,550, dated January 7, 1902.

Application filed March 31, 1900. Serial No. 10,871. (No model.)

*To all whom it may concern:*

Be it known that I, JAMES BARRETT, of Boston, in the county of Suffolk and State of Massachusetts, have invented certain new and useful Improvements in Washstand-Fixtures, of which the following is a description sufficiently full, clear, and exact to enable those skilled in the art to which it appertains or with which it is most nearly connected to make and use the same.

The present invention relates to washstand-fixtures having open plumbing; and one object is to provide an improved form of trap in which the seal is perfectly insured and access for cleaning purposes rendered more convenient than in the forms of traps heretofore employed in fixtures of this kind.

Another object is to provide for sustaining the bowl and its slab with greater stability than heretofore, at the same time reducing the space occupied by the plumbing. Furthermore, my improvements enable the fixture to be much enhanced in appearance.

With the above-stated objects in view the invention consists in certain novel features of construction and combinations of parts, the essential elements of which are set forth in the appended claims and a preferred form of embodiment of which is specifically described hereinafter and illustrated in the accompanying drawings, whereof—

Figure 1 represents a complete washstand-fixture having my invention embodied therein. Fig. 2 represents the same in side elevation. Fig. 3 represents the same in inverted plan. Fig. 4 is a sectional view, on an enlarged scale, of a portion of the structure.

The reference-letter $a$ designates a vertical wall, against which the fixture is secured and behind which a drain-pipe and vent may be supposed to run as part of a system of plumbing in the building. A short horizontal pipe-section $b$ extends through the wall to join such system and at its forward end is united with a trap whose main body portion $c$ is cylindrical and horizontally disposed below the plane of the said pipe-section, the said trap having a gooseneck $c'$ rising from its rear end and coupled to the pipe $b$ by a short horizontal part $c^2$. The front end of the trap is closed by a screw-plug $d$, whose removal gives free access for cleaning or other purposes, and the upper side of the trap is formed with a boss $e$, having a screw-threaded opening through it, receiving the lower end of a pipe $f$, which extends upwardly to the bowl $g$, being clamped thereto, so as to drain the same. The pipe $f$ extends a short distance into the interior space of the trap, as at $f'$, Fig. 4, for the purpose of preventing the trap being drained by siphonic action, for it will be seen that should such action be set up the siphon will be broken when the water in the body of the trap is lowered to the end of the pipe extension $f'$. Hence the seal will be preserved, for the column of water in the gooseneck $c'$ will flow back and raise the level of the water in the pipe $f$.

On the front side of the pipe $f$ some distance above the trap there is formed a socketed projection $f^2$, upstanding at about forty-five degrees to the pipe, and one end of an angular prop or brace $h$ occupies said socket, the brace extending for a distance on the same angle as the latter and then vertically, its upper end uniting with the bowl, which is thus largely supported through said brace by the connections back to the vertical wall.

The usual slab $i$ rests above the bowl and is sustained by brackets secured to the wall $a$, preferably through comparatively short base portions $j$, and having long arms $j'$, on which the slab rests. The bowl is held laterally by clamps having curved heads $k$, engaging its opposite sides, and flat shanks $k'$, running through grooves in the upper sides of the bracket-arms. These clamps are held in position by set-screws $m$, entered through the bracket-arms, and it will be seen that the bowl will be very firmly held in place.

The whole structure is well calculated to insure stability and at the same time takes up less space than has heretofore been occupied by similar structures. It will be noted that the usual legs for supporting the slab are dispensed with and the space under the slab and bowl at the front is left entirely free.

The horizontally-disposed trap takes the place of the vertical form of trap heretofore commonly used, in which there is an interior partition dividing the water-containing space, this having been found objectionable by reason of the fact that there are likely to be defects in the partition through which sewer-gas can penetrate.

Having thus explained the nature of the invention and described a way of constructing and using the same, though without attempting to set forth all of the forms in which it may be made or all of the modes of its use, it is declared that what is claimed is—

1. In a washstand-fixture the combination with a trap member consisting of a horizontally-disposed cylinder having an open end of the full diameter of the interior wall of the cylinder, a boss formation on one side a short distance back from said open end with a bore extending through the interior wall of the cylinder, and at the opposite end a gooseneck extension springing from the same side as the boss; of a drain-pipe engaging the boss-bore, and a closure removably engaged with the open end of the cylinder whereby the amount of projection of the drain-pipe inwardly beyond the interior wall of the cylinder may be readily ascertained, substantially as described.

2. In a washstand-fixture the combination with the bowl and slab; of brackets having horizontal arms upon which the slab rests; clamps having curved portions engaging the sides of the bowl and shanks extending between the slab and the bracket-arms; and clamping devices on the bracket-arms engaging the shanks of the bowl-clamps pressing the same against the slab, substantially as described.

3. In a washstand-fixture the combination with the bowl and slab; of supporting-brackets having horizontal arms upon which the slab rests; clamps having curved portions engaging the sides of the bowl and shanks extending through the bracket-arms and adjustable transversely thereof; and clamping devices engaging the bracket-arms and the shanks of the bowl-clamps to fix the latter at different adjustments, substantially as and for the purpose described.

In testimony whereof I have signed my name to this specification, in the presence of two subscribing witnesses, this 28th day of March, A. D. 1900.

JAMES BARRETT.

Witnesses:
ARTHUR W. CROSSLEY,
F. P. DAVIS.